(12) United States Patent
Sallioni

(10) Patent No.: US 10,994,463 B2
(45) Date of Patent: May 4, 2021

(54) SEAL SYSTEM FOR MELTED PLASTICS

(71) Applicant: SACMI Cooperativa Meccanici Imola Societa' Cooperativa, Imola (IT)

(72) Inventor: Andrea Sallioni, Imola (IT)

(73) Assignee: SACMI Cooperativa Meccanici Imola Societa' Cooperativa

( * ) Notice: Subject to any disclaimer, the term of this patent is extended or adjusted under 35 U.S.C. 154(b) by 689 days.

(21) Appl. No.: 15/555,318

(22) PCT Filed: Mar. 4, 2016

(86) PCT No.: PCT/IB2016/051217
§ 371 (c)(1),
(2) Date: Sep. 1, 2017

(87) PCT Pub. No.: WO2016/147075
PCT Pub. Date: Sep. 22, 2016

(65) Prior Publication Data
US 2018/0056570 A1 Mar. 1, 2018

(30) Foreign Application Priority Data
Mar. 13, 2015 (IT) .......................... 102015000008530

(51) Int. Cl.
*B29C 43/36* (2006.01)
*B29C 48/25* (2019.01)
(Continued)

(52) U.S. Cl.
CPC ........ *B29C 48/254* (2019.02); *B29C 33/0038* (2013.01); *B29C 43/3607* (2013.01); *B29C 48/0011* (2019.02); *B29C 48/09* (2019.02); *B29C 48/32* (2019.02); *F04B 53/143* (2013.01); *F16J 15/16* (2013.01); *B29C 31/048* (2013.01); *B29C 2043/3628* (2013.01); *B29L 2031/757* (2013.01)

(58) Field of Classification Search
CPC . B29C 33/0038; B29C 43/32; B29C 43/3607; B29C 47/08; B29C 47/0808; B29C 43/02; B29C 43/04; B29C 43/36
See application file for complete search history.

(56) References Cited

U.S. PATENT DOCUMENTS 3,757,718 A * 9/1973 Johnson .................. B21C 23/00
425/387.1
3,950,119 A * 4/1976 Reichenbach .... B29C 45/14336
425/129.1
(Continued)

FOREIGN PATENT DOCUMENTS

JP S58187425 U 12/1983
JP 2005512849 A 5/2005
(Continued)

*Primary Examiner* — Thu Khanh T Nguyen
(74) *Attorney, Agent, or Firm* — Laubscher & Laubscher, P.C.

(57) ABSTRACT

A seal system includes a male body and a female body that are slidable in relation to one another in an axial direction and between which an interstice is arranged. Plastics in pasty state pass through the interstice to a chamber partially defined by at least one of the aforementioned bodies. An elastic strip is arranged in the interstice to prevent leakage of the plastics.

9 Claims, 10 Drawing Sheets

(51) Int. Cl.
  *B29C 33/00* (2006.01)
  *F16J 15/16* (2006.01)
  *B29C 48/32* (2019.01)
  *B29C 48/00* (2019.01)
  *B29C 48/09* (2019.01)
  *F04B 53/14* (2006.01)
  *B29C 31/04* (2006.01)
  *B29L 31/00* (2006.01)

(56) References Cited

U.S. PATENT DOCUMENTS

| | | | |
|---|---|---|---|
| 6,652,259 | B1 | 11/2003 | Beltrandi |
| 6,725,769 | B1* | 4/2004 | Williams ................ B41F 15/46 |
| | | | 101/123 |
| 8,899,956 | B2* | 12/2014 | Hegler .................... B29C 48/09 |
| | | | 425/395 |
| 2005/0147709 | A1 | 7/2005 | Bergami et al. |
| 2007/0172538 | A1* | 7/2007 | Adas ....................... B29C 45/27 |
| | | | 425/568 |
| 2007/0286919 | A1 | 12/2007 | Parrinello |
| 2012/0171381 | A1 | 7/2012 | Haar |

FOREIGN PATENT DOCUMENTS

| | | |
|---|---|---|
| JP | 2008286357 A | 11/2008 |
| JP | 2012172694 A | 9/2012 |
| WO | 0030825 A1 | 6/2000 |
| WO | 03053649 A1 | 7/2003 |
| WO | 2004080684 A1 | 9/2004 |
| WO | 2011023399 A1 | 3/2011 |

* cited by examiner

SEAL SYSTEM FOR MELTED PLASTICS

CROSS-REFERENCE TO EARLIER APPLICATION

This application is a § 371 National Stage Entry of PCT/IB2016/051217 filed Mar. 4, 2016 entitled "Seal System for Melted Plastics." PCT/IB2016/051217 claims priority to IT102015000008530 filed Mar. 13, 2015. The entire contents of these applications are incorporated herein by reference in their entireties.

BACKGROUND OF THE INVENTION

The invention relates to a seal system for plastics in melted or pasty state, in particular for preventing the leak of plastics through the interstice between two cylindrical surfaces coupled in reciprocal linear sliding to prevent the undesired leak of plastics from apparatuses that process the material in melted or pasty state.

Specifically, but not exclusively, the invention can be applied in a mould for compression-moulding of doses of plastics and/or in an extruder for dispensing annular doses of plastics (intended for compression-moulding) and/or in a piston pump for supplying plastics.

The prior art includes various types of apparatus for processing melted or pasty plastics in which linear sliding between cylindrical elements occurs. To avoid leakage of plastics through the interstice between the coupled cylindrical surfaces, it is known to construct such cylindrical surfaces in an extremely precise manner, i.e. with much reduced dimensional and geometric tolerances, with consequent complications in construction. Further, also in the presence of very reduced constructional tolerances, the seal effect can be insufficient and it is therefore desirable to improve the efficacy thereof, in particular in conditions of critical operation, for example because of the high pressure and temperature of the plastics.

SUMMARY OF THE INVENTION

One object of the invention is to make a seal system for plastics that is able to overcome one or more of the aforesaid drawbacks of the prior art.

One advantage is to provide a system for sealing (cylindrical) elements that are linearly slidable in relation to one another.

Another advantage is to prevent leakage of (melted or pasty) plastics through the interstice disposed between two coupled (cylindrical) surfaces.

A further advantage is to ensure an effective seal against leakage of plastics even with relatively wide dimensional and geometrical tolerances.

It is a further advantage is to obtain a reliable seal even in critical operating conditions, for example because of high pressure and temperatures.

Another advantage is to make available a simple and inexpensively constructed system for sealing (melted or pasty) plastics.

Such objects and advantages and still others are achieved by a seal system and/or by an apparatus according to one or more of the claims set out below.

In one embodiment, a seal system includes at least two bodies, a male and a female body, which are slidable with respect to one another, between which an interstice is arranged and through which the plastics in melted or pasty state can leak. The male and female bodies at least partially define at least one chamber. A seal ring arranged in the interstice to prevent the leak of the plastics. The aforesaid seal ring can include an open elastic ring. In particular the seal ring can have two side surfaces that are flat and parallel to one another, such as an elastic strip or seal segment.

BRIEF DESCRIPTION OF THE DRAWINGS

The invention can be better understood and implemented with reference to the attached drawings, which illustrate some embodiments thereof by way of non-limiting example.

DETAILED DESCRIPTION

Figure 2:
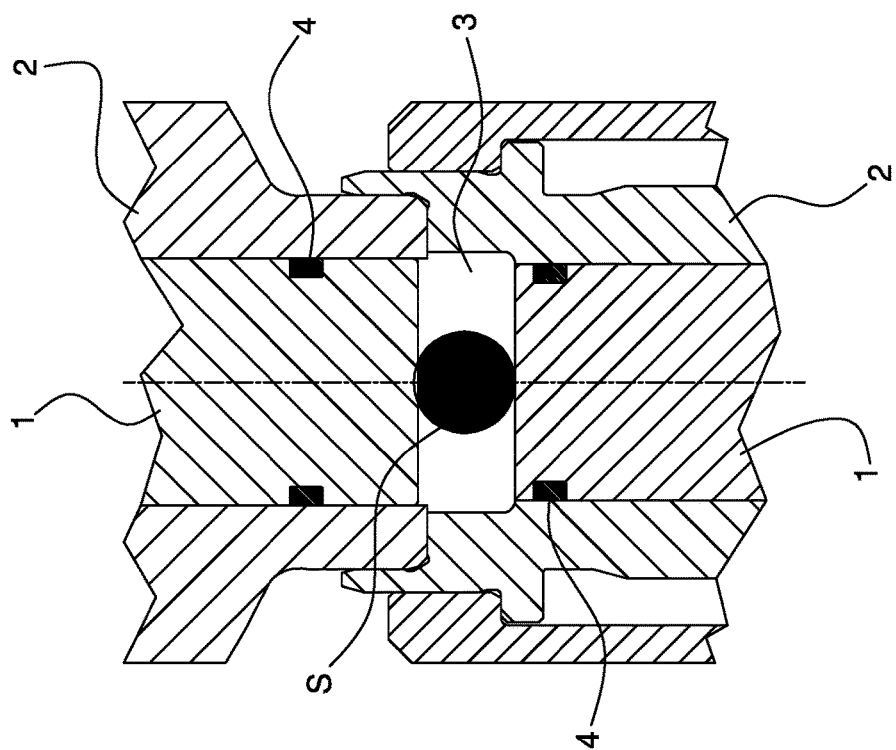
FIG. 2 is the section of FIG. 1 in a second configuration in which the punch and die are about to close to carry out compression moulding of the dose of plastics.

In this description, like elements that are common to the various illustrated embodiments have been indicated by the same numbering.

A seal system according to the invention includes, at least one male body 1 having an outer surface. The seal system includes at least one female body 2 having an inner surface coupled with the outer surface of the male body 1.

The inner surface and the outer surface can be, as in the embodiments disclosed here, slidable in relation to one another, in particular slidable in an axial direction. Sliding between the surfaces includes at least one sliding component in axial direction. Sliding between the surfaces includes at least one sliding component for sliding in a circumferal direction, i.e. a component that rotates (even minimally). The inner and outer surfaces can be, for example, conjugate surfaces of a pair, in particular with translating motion (for example a sliding pair or a cylindrical pair). It is further possible for an interstice (or thin interstice) to be between the aforesaid inner and outer surfaces. The inner surface and the outer surface can be cylindrical surfaces that are coaxial to one another. The interstice can be, in particular, of cylindrical shape.

The seal system includes at least one chamber 3 arranged for containing plastics in melted or pasty state. The chamber 3 can be at least partially defined by the male body 1 and/or by the female body 2. The chamber 3 can communicate with the interstice in at least one operating configuration of the two bodies 1 and 2 that are coupled with one another.

The seal system includes at least one seal ring 4 that can be arranged, for example, in the interstice. The seal ring 4 prevents leakage of melted or pasty state plastics originating in chamber 3 through the interstice.

The seal ring 4 includes, an open elastic ring having an opening or cut, similar to an elastic strip of known type. The seal ring 4 includes two side surfaces that are flat and parallel to one another, similar to an elastic strip of known type.

The seal ring 4 can be housed in a seat obtained in the male body 1 or in a seat obtained on the female body 2.

The seal ring 4 can be made of steel, in particular of a stainless and/or hardened steel. The seal ring 4 can have at least one surface treatment to improve the slidability thereof and thus reduce the friction thereof and/or improve the resistance thereof. The seal ring 4 can be made of plastics having pressure and temperature thresholds that are greater than that of the melted plastics contained in the chamber. The seal ring 4 can be made of PTFE, PTFE reinforced with reinforcing particles (for example fibres, balls, hollow balls, glass particles, graphite particles or to various combinations thereof) or graphite or graphite-based material.

The seal system can be suitable for various temperature and pressure conditions. In particular, to prevent seizing up or excessive clearance, the seal system ensures the seal against leaks of the melted or pasty plastics even if the coupling surfaces are made of materials with different thermal expansion. For example the male body 1 and the female body 2 could be made of one of steel and the other of bronze or one of steel and the other of cast iron, etc.

With reference to FIGS. 1 to 5, a first embodiment is illustrated in which the seal system is applied to a mould for compression moulding of doses S of plastics. In this specific embodiment two male bodies 1 and two female bodies 2 are arranged, each of which is coupled with a respective male body 1. A first pair of male and female bodies 1 and 2 belongs to an upper first half mould 5 of the mould. A second pair of male and female bodies 1 and 2 belongs to a lower second half mould 6 of the mould. The first half mould 5 includes a punch. The second half mould 6 includes a die. One male body 1 and one female body 2 are two portions of the first half mould 5. One male body 1 and one female body 2 are two portions of the second half mould 6. The chamber 3 is a moulding cavity of the mould.

As is seen in this specific embodiment, the seal system includes a second male body 1, having a second outer surface, and a second female body 2, having a second inner surface coupled with the second outer surface. The second inner and outer surfaces are axially slidable in relation to one another. A second interstice can be arranged between the second inner and outer surfaces. The chamber 3 containing the melted plastics is at least partially bounded by the second male body 1 and/or by the second female body 2. The chamber 3 communicates with the second interstice in at least one operating configuration of the second male and female bodies 1 and 2. In this specific embodiment a second seal ring 4 is arranged in the second interstice to prevent leakage of melted or pasty plastics and the exit of plastics through the second interstice. The second male body 1 and the second female body 2 form two portions of the second half mould 6. The chamber 3 (moulding cavity) is defined between the two half moulds 5 and 6.

In this specific embodiment the seal rings 4 are outer rings housed within corresponding seats obtained on the two male bodies 1.

Figure 1:
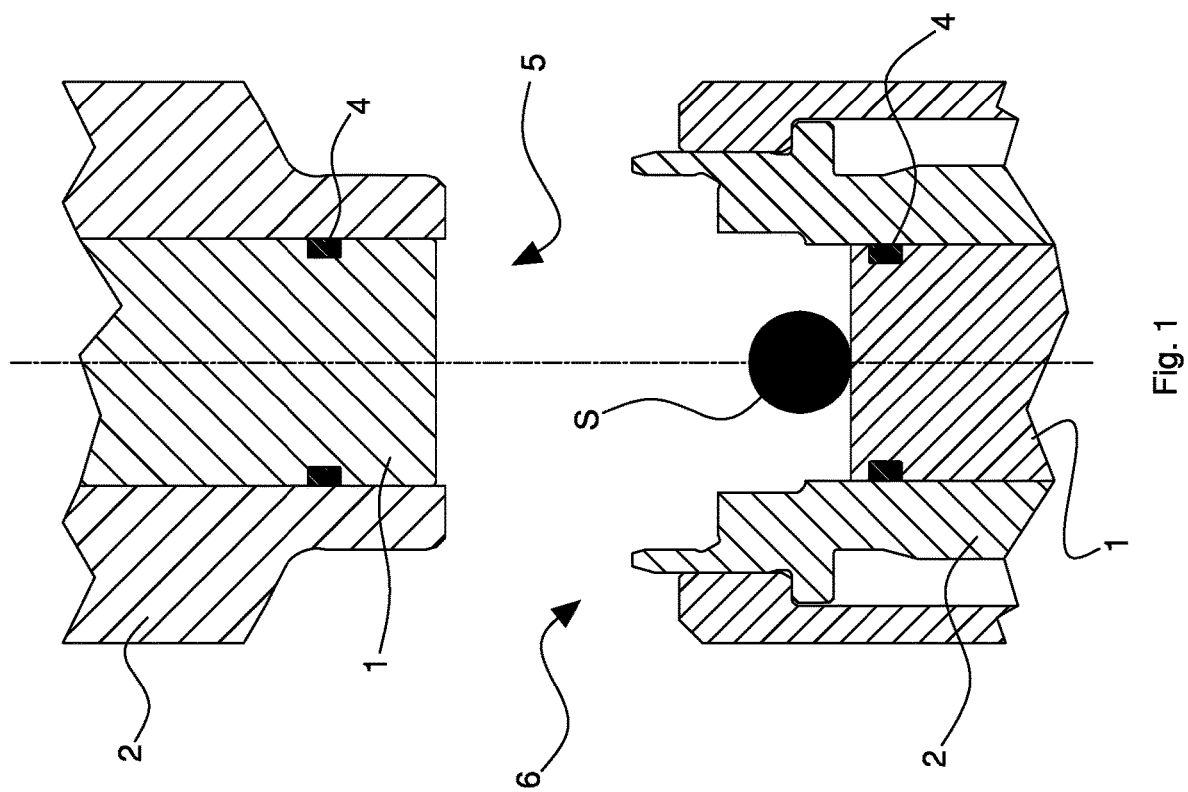
FIG. 1 is a section of a mould that is suitable for compression-moulding doses of plastics and is provided with a first embodiment of a seal system made according to the invention, in a first configuration in which the mould has an upper punch and a lower die that are open to be able to receive a dose of plastics to be moulded.
Figure 3:
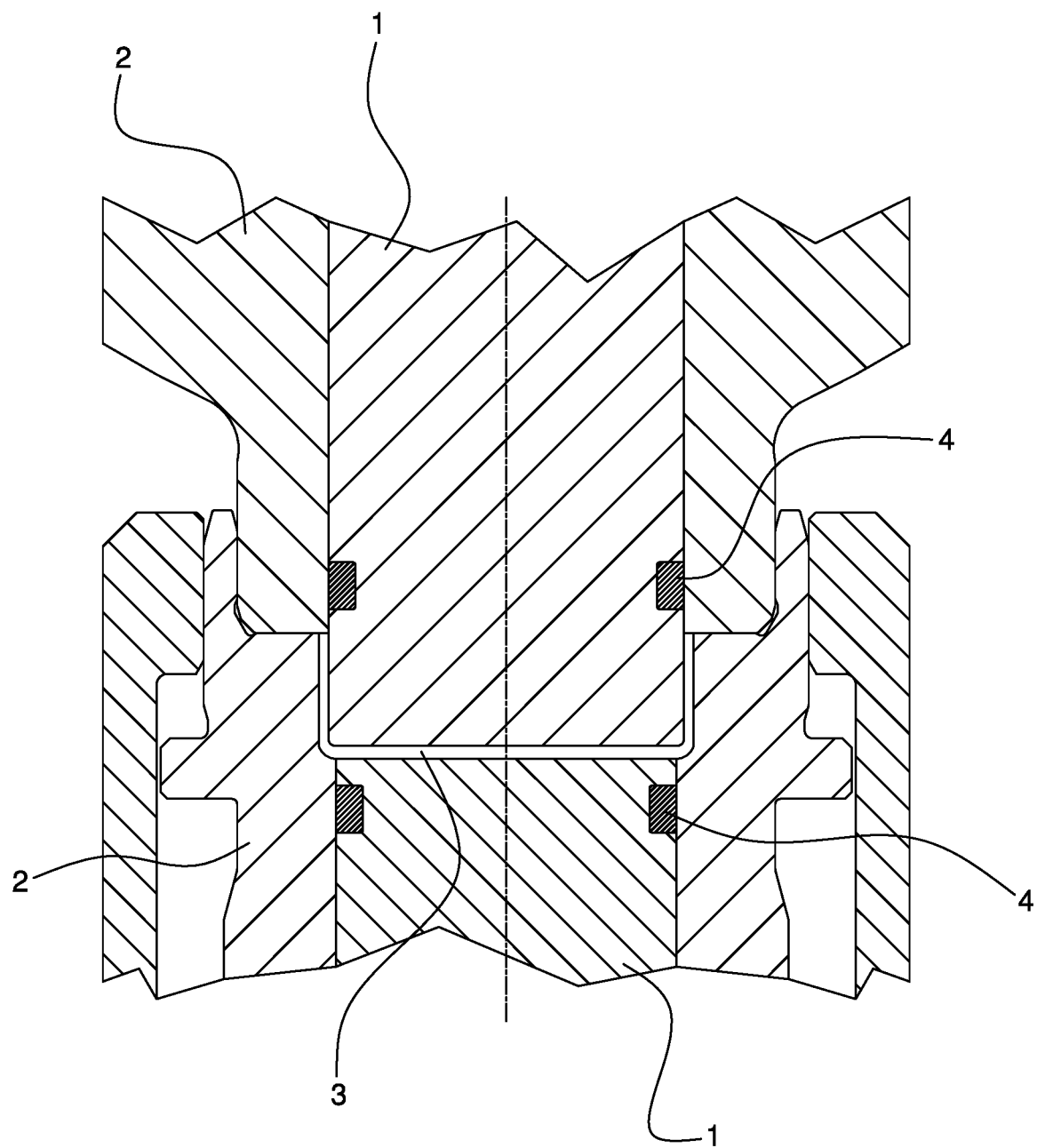
FIG. 3 is the section of FIG. 1 in a third configuration in which the punch and die are closed to define a forming cavity of a workpiece.
Figure 4:
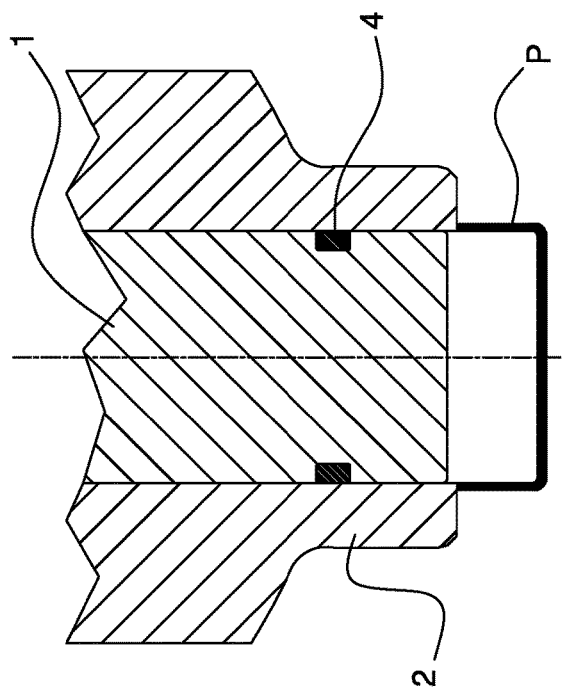
FIG. 4 is the section of FIG. 1 in a fourth configuration in which the punch and die are open to enable the moulded workpiece to be extracted.
Figure 4:
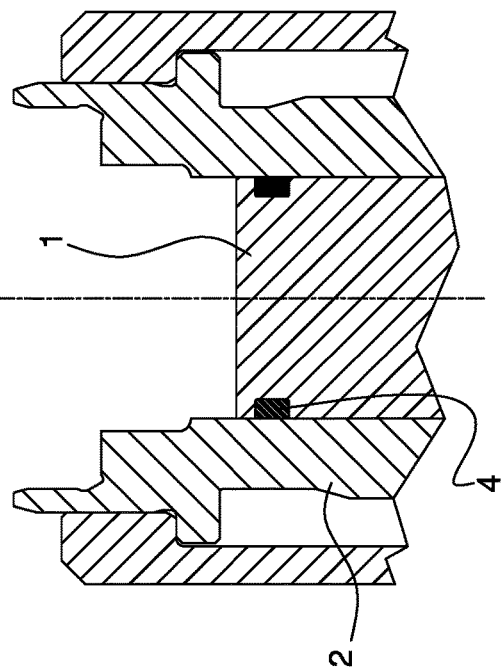
Figure 5:
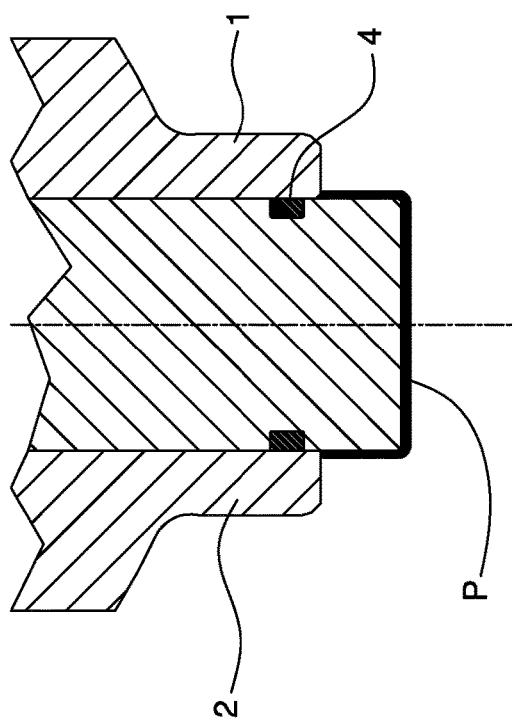
FIG. 5 is the section of FIG. 1 in a fifth configuration in the step of extracting the moulded workpiece.
Figure 5:
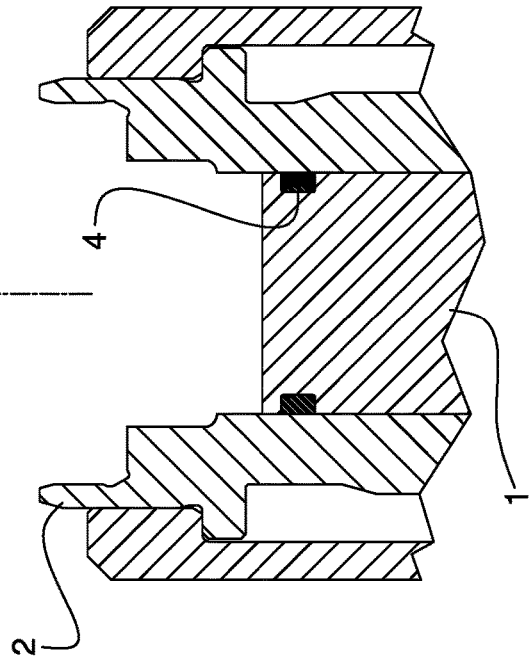

In FIG. 1, the half moulds 5 and 6 are open to enable introduction of a dose S of plastics. In FIG. 2 the half moulds 5 and 6 have already started the closing movement that is completed in FIG. 3. In FIG. 4 the half moulds 5 and 6 are opened to enable the moulded workpiece P to be subsequently extracted, as shown in FIG. 5. During operation of the mould, the first male body 1 and the first female body 2 perform a corresponding axial sliding movement, as do the second male body 1 and the second female body 2. The two seal rings 4 stop the possible leakage of plastics from the chamber 3 through the respective interstices.

With reference to the embodiments of FIGS. 6 to 13, the chamber 3 containing the plasticised material includes at least one portion of an annular conduit 7 for supplying extruded plastics, arranged in an outlet zone of an extruder. The extruder can be suitable for dispensing annular doses of plastics intended for compression-moulding. The chamber 3 can have, as in these embodiments, at least one annular outlet 8 of the plastics. The male body 1 includes an outer wall that delimits the annular conduit 7 in collaboration with a core 9. The female body 2 includes at least one shearing element that is axially movable with respect to the male body 1. The female body 2 is movable with a reciprocal motion between at least one lower first position shown in FIGS. 7, 9, 11, and 13 in which the shearing element closes the annular outlet 8 after separating an annular dose of plastics that has previously exited the annular outlet 8, and at least one upper second position shown in FIGS. 6, 8, 10 and 12 in which the shearing element leaves the annular outlet 8 open to enable exiting of the plastics.

Figure 6:
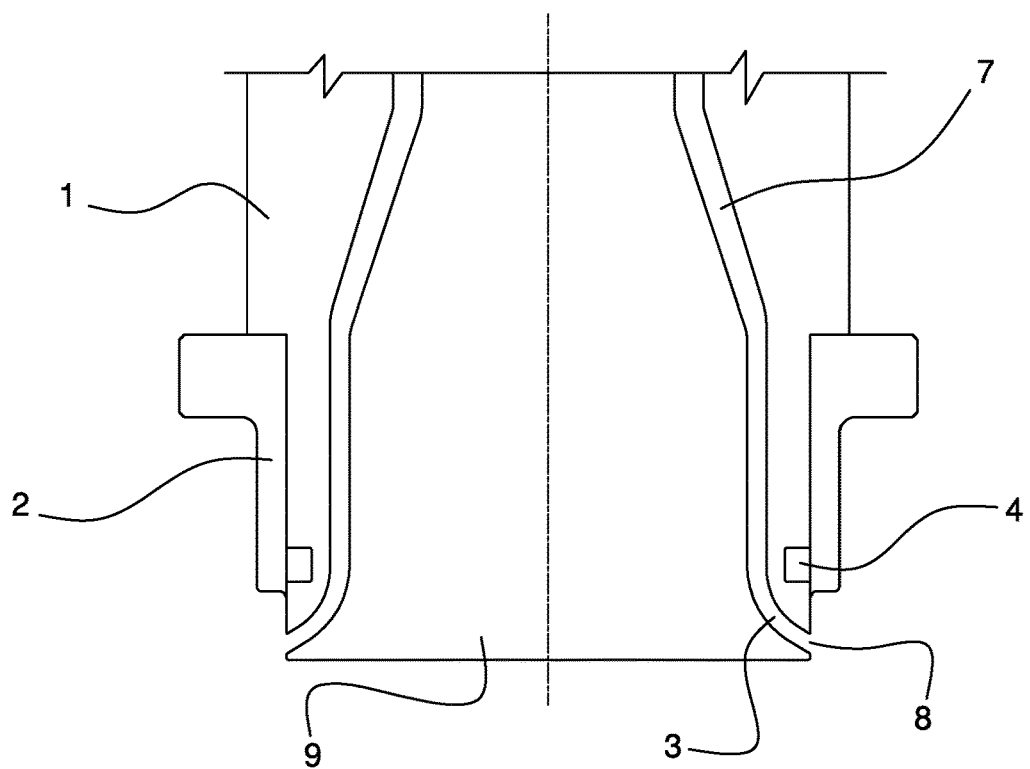
FIG. 6 is an outlet section of an extruder that is suitable for dispensing annular doses of plastics intended for compression-moulding and which is provided with a second embodiment of a seal system made according to the invention, in a first configuration in which an annular portion of plastics can exit the extruder before being separated by a shearing element.
Figure 7:
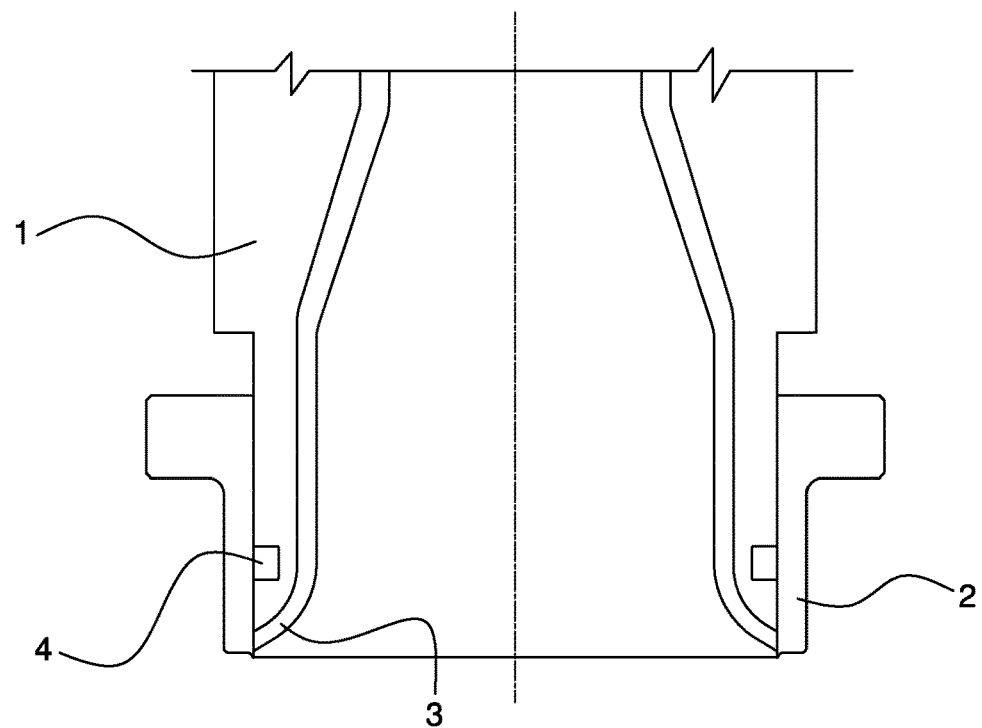
FIG. 7 is the section of FIG. 6 in a second configuration in which the shearing element has separated an annular dose from the rest of the plastics.
Figure 8:
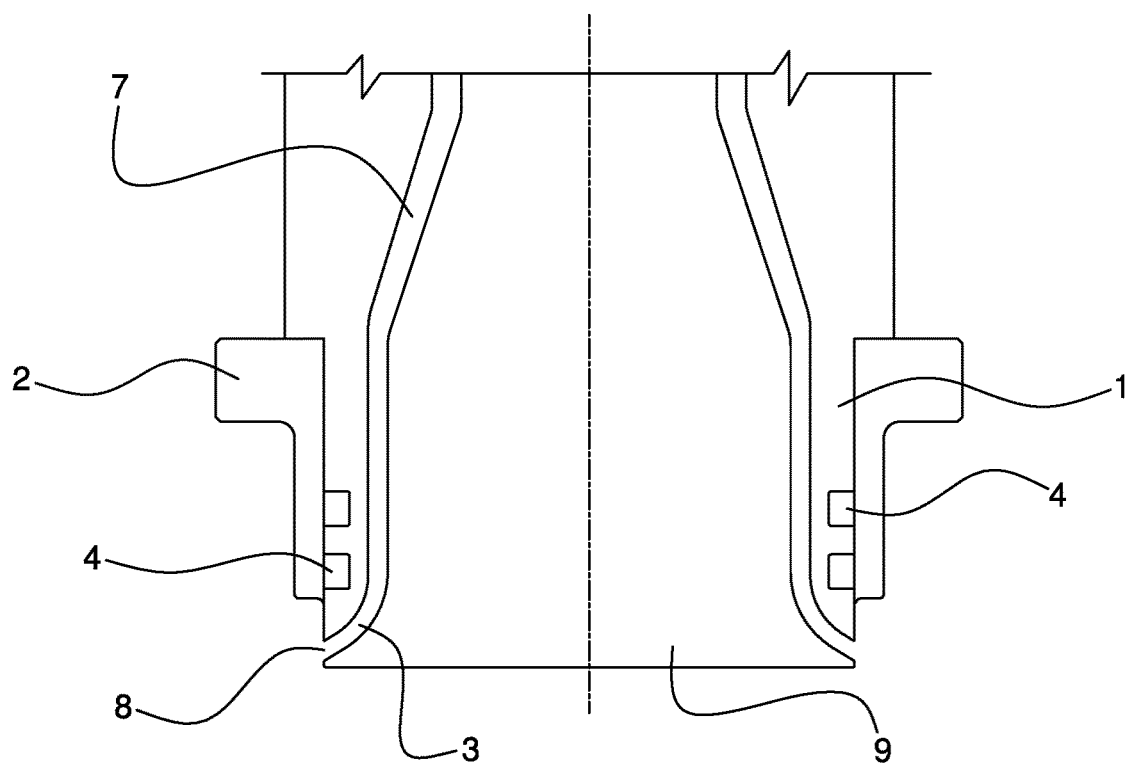
FIG. 8 is an outlet section of an extruder that is provided with a third embodiment of a seal system made according to the invention, in a material exit configuration similar to that of FIG. 6.
Figure 9:
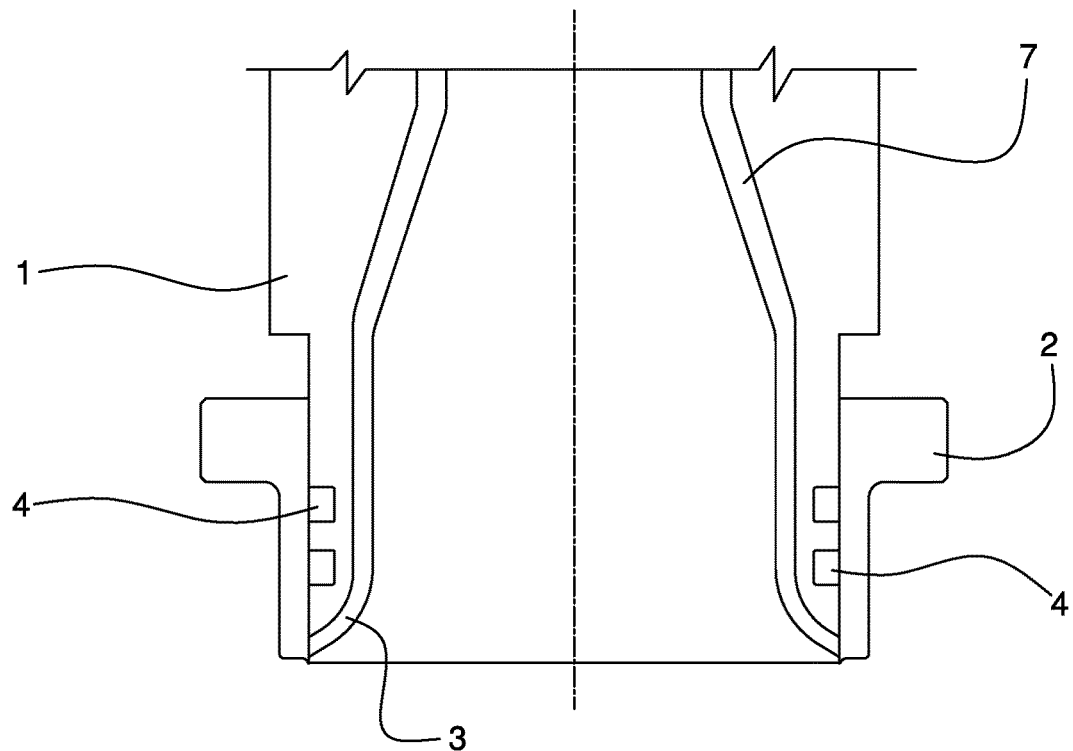
FIG. 9 is the section of FIG. 8 in an annular dose shearing configuration similar to that of FIG. 7.
Figure 10:
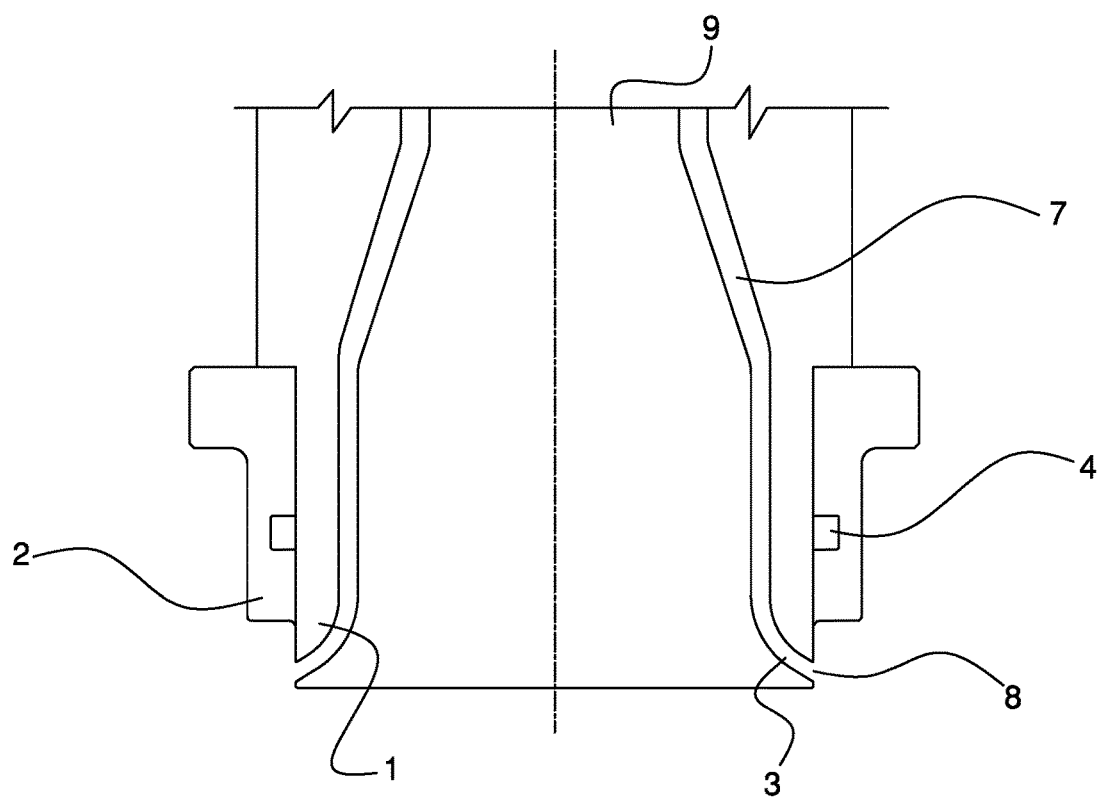
FIG. 10 is an outlet section of an extruder that is provided with a fourth embodiment of a seal system made according to the invention, in a material exit configuration similar to that of FIG. 6.
Figure 11:
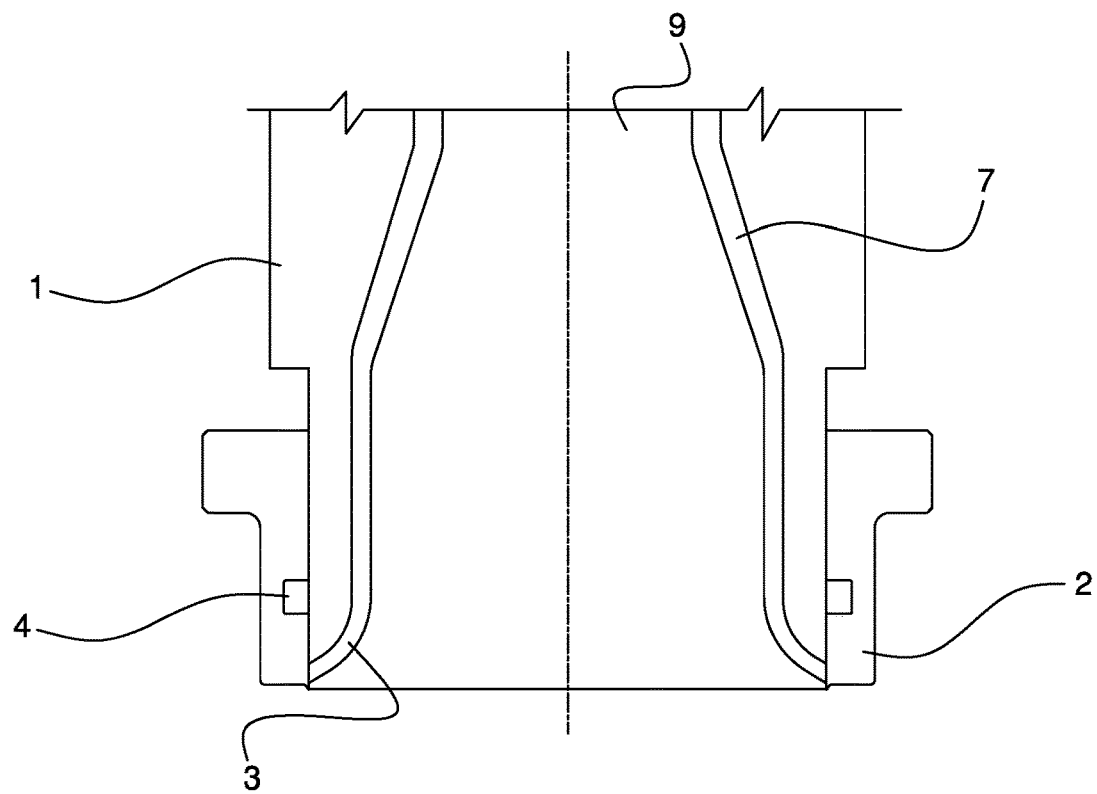
FIG. 11 is the section of FIG. 10 in an annular dose shearing configuration similar to that of FIG. 7.
Figure 12:
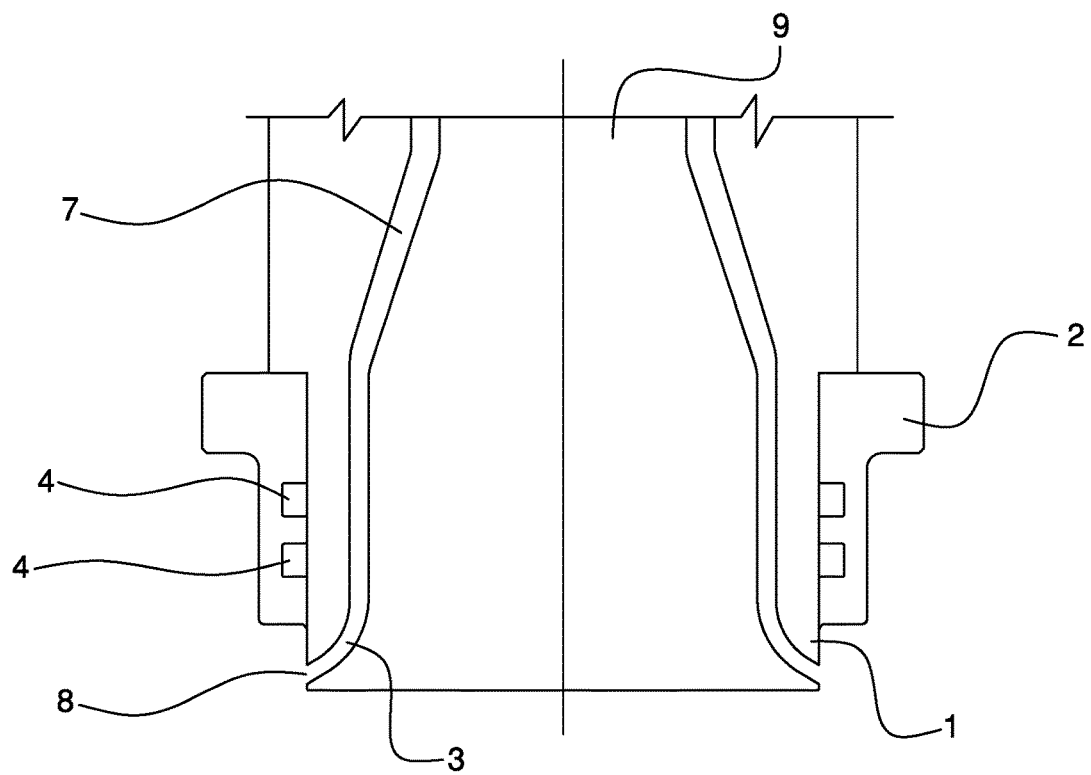
FIG. 12 is an outlet section of an extruder that is provided with a fifth embodiment of a seal system made according to the invention, in a material exit configuration similar to that of FIG. 6.
Figure 13:
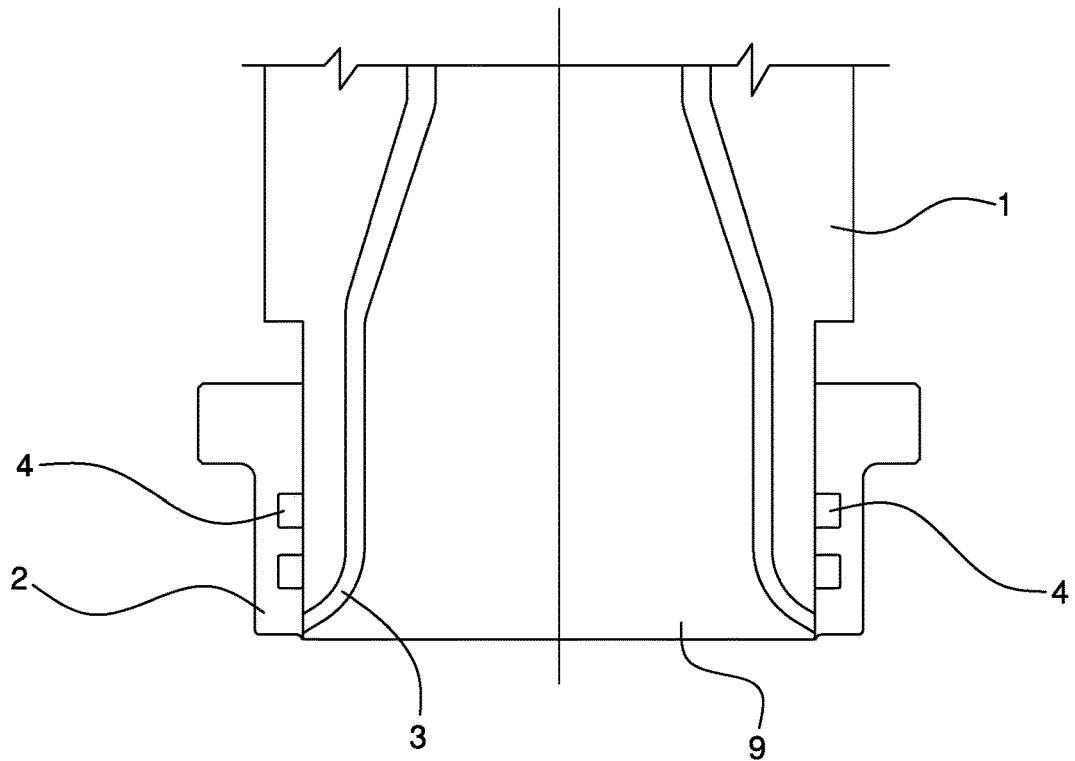
FIG. 13 is the section of FIG. 12 in an annular dose shearing configuration similar to that of FIG. 7.

It is possible to arrange just one outer seal ring 4 fitted to the male body 1 as shown in FIGS. 6 and 7, or two outer seal rings 4 both fitted to the male body 1 as shown in FIGS. 8 and 9, or only one inner seal ring 4 fitted to the female body 2 (FIGS. 10 and 11), or two inner seal rings 4 both fitted to the female body 2 as shown in FIGS. 12 and 13. It is nevertheless possible to provide other arrangements also with a different number of seal rings.

Figure 14:
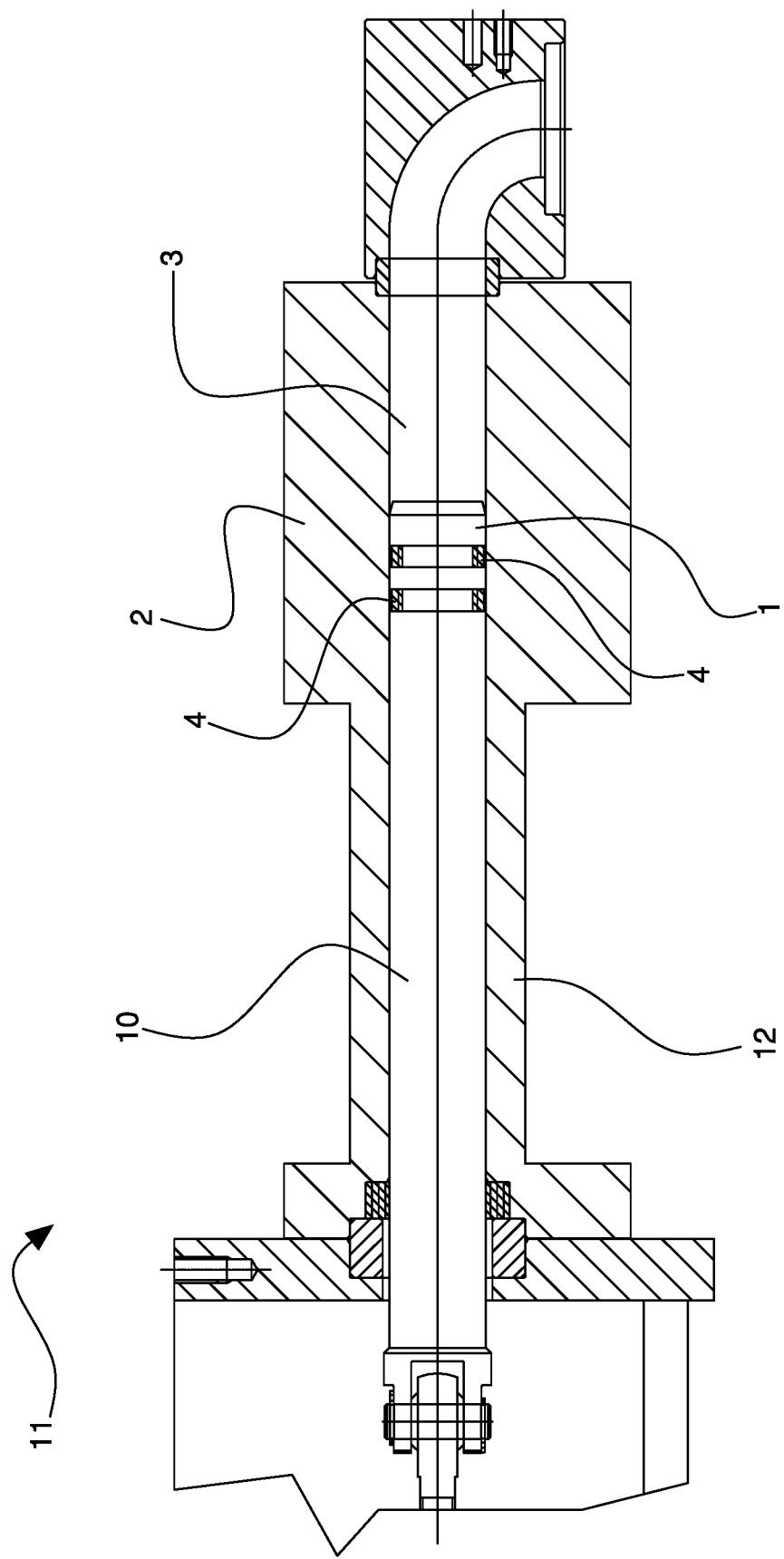
FIG. 14 is a section of a piston pump that is suitable for supplying plastics in melted or pasty state and is provided with a sixth embodiment of a seal system made according to the invention.

With reference to FIG. 14, the male body 1 includes at least one portion of a piston 10 of a piston pump 11 for plastics and the female body 2 includes at least one portion of a cylinder 12 of the piston pump 11. The piston pump 11 supplies plastics in melted or pasty state to a user, such as a moulding apparatus. The driving device of the piston pump 11 can be of known type and has therefore not been illustrated in greater detail. The seal system includes, in this specific case, two outer seal rings 4 fitted to the male body 1 i.e., piston 10.

Figure 15:
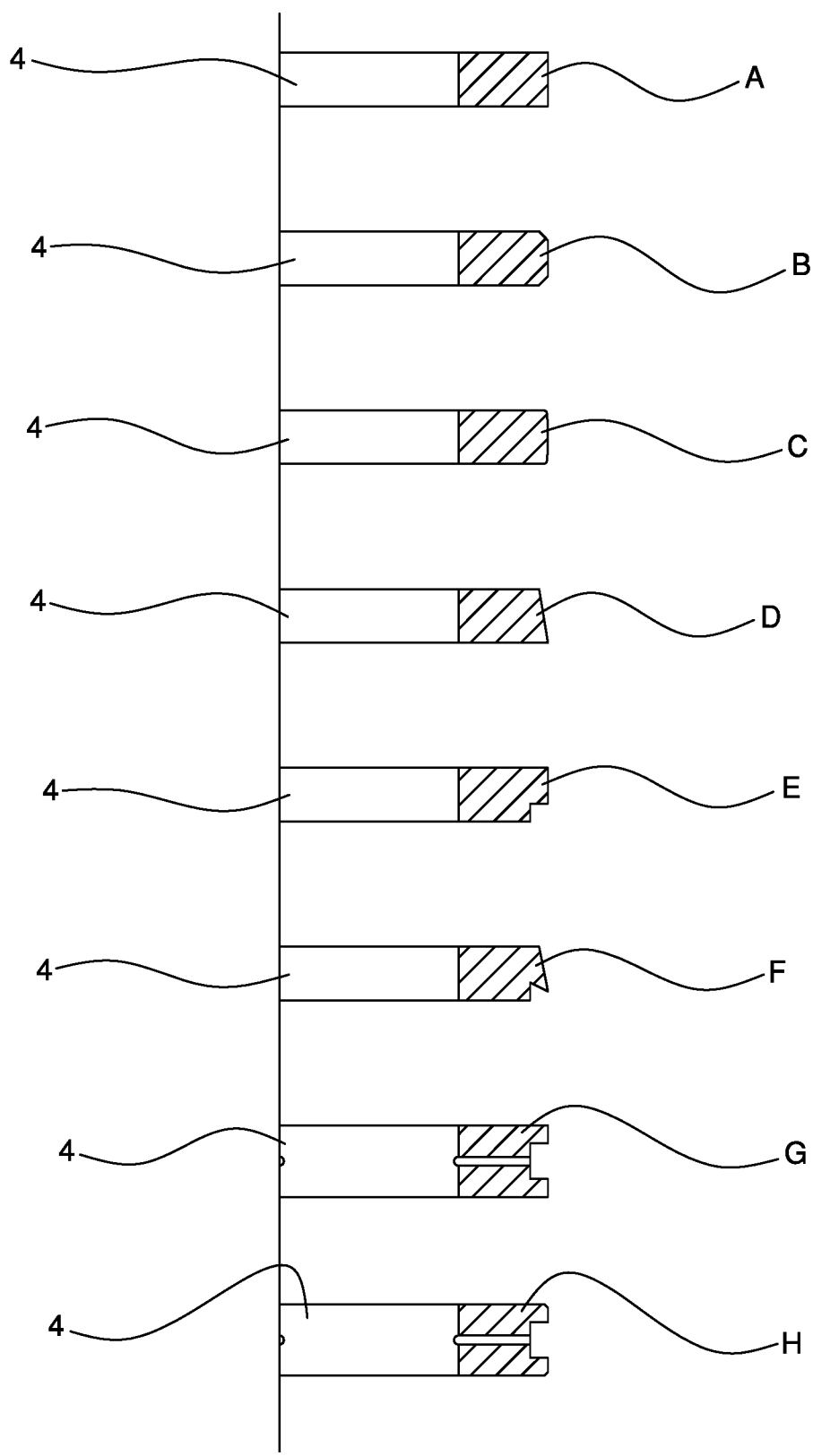
FIG. 15 shows the section of eight different embodiments of seal rings that are usable in a seal system made according to the invention.

In FIG. 15 additional embodiments of a section of the seal ring 4 are shown. In embodiment A, a section of rectangular shape is shown. According to embodiment B, a rectangular section with outer bevels is shown. According to embodiment C, a section with a slightly convex surface is shown. According to embodiment D, a section with a tilted contact surface is shown. According to embodiment E, a section with an outer step is shown. According to embodiment F, a section with a tilted contact surface and outer step is shown. According to embodiment G, a section of a grooved ring with holes is shown. According to embodiment H, a section of a grooved ring with outer bevels and holes is shown. It is possible to have seal rings with sections other than those illustrated, for example with a section with a square, trapezoid, semi-trapezoid shape, with inner bevel, with inner step, an "L" shape, etc.

Each of the seal rings illustrated includes an elastic ring of open shape with a coupling, opening or cut where the ends of the ring can join and of flat shape with opposite flat and parallel side surfaces, in the form of an elastic strip. It is nevertheless possible to use seal rings of different type.

It is possible, for example, to use expanding seal rings, in which the seat (groove) of the ring is in the male body and the seal surface is the outer surface in contact with the female body, or contracting seal rings in which the seat or groove of the ring is in the female body and the seal surface is the inner surface in contact with the male body.

In the illustrated embodiments each seal ring 4 includes a ring made as a single piece. It is nevertheless possible to use a seal ring made of several parts, for example a ring formed of a combination of two or three rings, for example with an inner ring and an outer ring (and possible intermediate ring).

Figure 16:
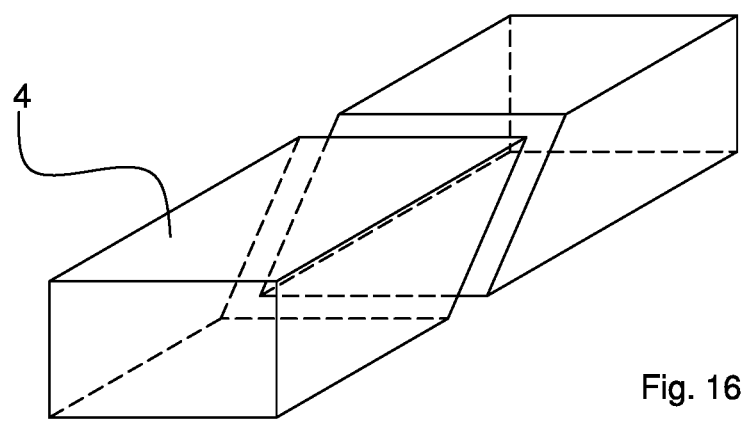
FIGS. 16 to 18 show three embodiments, respectively, of couplings or cuts of open rings that are usable in a seal system made according to the invention.
Figure 17:
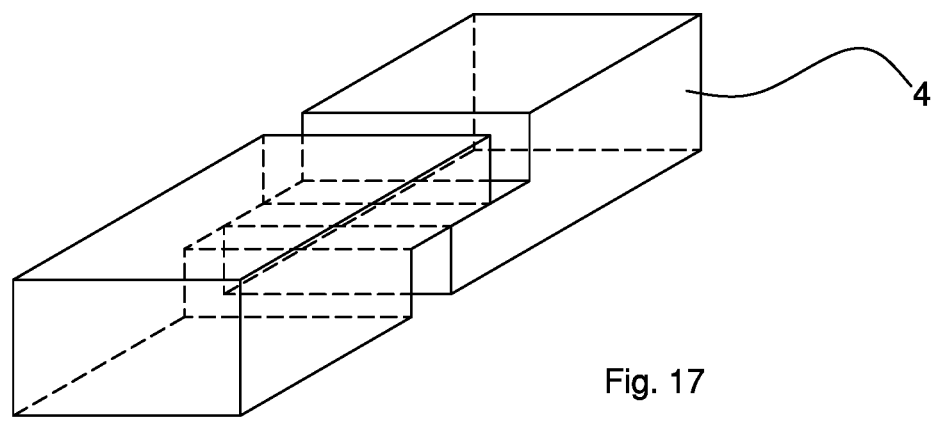
Figure 18:
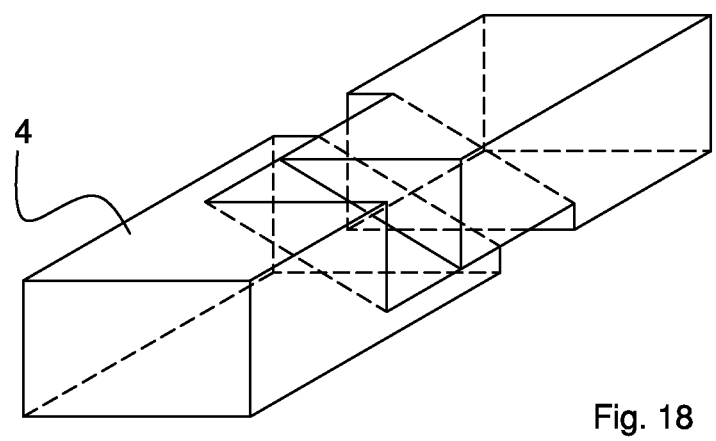

In FIGS. 16 to 18 three embodiments are shown of possible junctions, openings or cuts of the seal ring 4. In particular, an oblique coupling is shown in FIG. 16, a bayonet coupling is shown in FIG. 17 and a tilted bayonet coupling is shown in FIG. 18. Nevertheless, other types of couplings, openings or cuts are possible, for example cuts adopted for elastic strips or elastic seal segments. It is further possible to use pin rings or other types of ring that are used as elastic segments.

The invention claimed is:

1. A mold for compression molding doses of plastics, comprising:
    a punch including a first male body having a first outer surface and a first female body having a first inner surface coupled with said first outer surface, said first inner and outer surfaces being cylindrical surfaces that are coaxial with one another and being at least partially slidable in relation to one another in an axial direction during compression molding of a dose of plastics;
    a die including a second male body having a second outer surface and a second female body having a second inner surface coupled with said second outer surface, said second inner and outer surfaces being at least partially slidable in relation to one another in said axial direction during compression molding of a dose of plastics;
    a molding cavity defined between said punch and said die when said punch and said die are in a closed configuration for compression molding a dose of plastics, said molding cavity being bounded by said first male body, said first female body, said second male body, and said second female body;
    a first interstice arranged between said first inner and outer surfaces, said molding cavity communicating with said first interstice, wherein plastics that are contained in said molding cavity can leak through said first interstice;
    at least one first seal ring arranged in said first interstice to prevent leakage of said plastics, said first seal ring comprising a first open elastic ring;
    a second interstice arranged between said second inner outer surfaces, said molding cavity communicating with said second interstice, wherein plastics that are contained in said molding cavity can leak through said second interstice; and
    at least one second seal ring arranged in said second interstice to prevent leakage of said plastics, said second seal ring comprising a second open elastic ring.

2. The mold according to claim 1, wherein said first seal ring has two ends with two mating side surfaces that are flat and parallel to one another.

3. The mold according to claim 1, wherein said first seal ring is housed in a seat arranged on said first male body.

4. The mold according to claim 1, wherein said first seal ring is housed in a seat arranged on said first female body.

5. The mold according to claim 1, wherein said first seal ring is made of at least one of stainless steel, hardened steel, and plastics having a resistance to pressure and temperature that is greater than the plastics contained in said molding cavity.

6. The mold according to claim 1, wherein said second seal ring has two ends with two mating side surfaces that are flat and parallel to one another.

7. The mold according to claim 1, wherein said second seal ring is housed in a seat arranged on said second male body.

8. The mold according to claim 1, wherein said second seal ring is housed in a seat arranged on said second female body.

9. The mold according to claim 1, wherein said second seal ring is made of at least one of stainless steel, hardened steel, and plastics having a resistance to pressure and temperature that is greater than the plastics contained in said molding cavity.

* * * * *